United States Patent [19]
Fernandez et al.

[11] Patent Number: 5,812,749
[45] Date of Patent: Sep. 22, 1998

[54] METHOD OF AND SYSTEM FOR TESTING NETWORK TIME PROTOCOL CLIENT ACCURACY

[75] Inventors: Louis R. Fernandez, Garland; Douglas D. Dong, Fort Worth, both of Tex.

[73] Assignee: MCI Communication Corporation, Washington, D.C.

[21] Appl. No.: 773,435

[22] Filed: Dec. 27, 1996

[51] Int. Cl.⁶ ........................................... H04L 7/00
[52] U.S. Cl. ........................................ 395/182.02
[58] Field of Search .................. 364/DIG. 1, DIG. 2; 375/354, 355, 356, 180, 182.02, 184.01, 200.78

[56] References Cited

U.S. PATENT DOCUMENTS 5,416,808  5/1995  Witsuman et al. .................... 375/356

*Primary Examiner*—Robert B. Harrell

[57] ABSTRACT

A system and method for testing the accuracy of a network time protocol (NTP) client in a network that includes a time server that receives time information from a time source. The method polls the time source and the NTP client for timestamps at a regular time interval. The polling of the NTP client is offset from the polling of the time source by a fixed time offset. The method analyzes timestamps received from the time source and the NTP client in response to polling.

21 Claims, 3 Drawing Sheets

METHOD OF AND SYSTEM FOR TESTING NETWORK TIME PROTOCOL CLIENT ACCURACY

FIELD OF THE INVENTION

The present invention relates generally to network testing, and more particularly to a method of and system for testing the accuracy of a network time protocol client in a network that includes a time server.

DESCRIPTION OF THE PRIOR ART

In experiments or observations that involve time, it is necessary to have an accurate clock or time source. There are at least two measures of clock accuracy. One measure is in the sense of elapsed time, which depends upon the accuracy of the clock from second to second. The other measure is more absolute in the sense of agreement with a standard time of day. The two measures are related in that a local clock may be set or synchronized to a standard clock at a certain time. The agreement between the local clock and the reference clock at a later time depends upon the accuracy of the local clock in the sense of measuring elapsed time.

In experiments where all of the observations are performed at a single location, time may be measured with a single clock. In experiments that involve measuring the time between events, the accuracy of the time data is dependent upon the accuracy of the clock in the elapsed time sense. In such experiments, accuracy in the more absolute sense is not necessary. However, certain local experiments or observations, such as astronomical or navigational observations, require accuracy in the clock in the more absolute sense.

In experiments that involve observations at multiple remote locations, each observer must have a clock that is accurate in both the elapsed time and absolute senses. For example, in experiments that measure events occurring over communications or data networks, it is necessary that the time associated with observations of events at various points in the network be accurate in the absolute sense. Accordingly, in experiments conducted on networks, it is necessary that each observer's local clock be synchronized with a standard reference clock.

There are various systems for synchronizing clocks in networks. One such system is Network Time Protocol (NTP), which is a protocol for synchronizing a set of network clocks using a set of distributed clients and servers. The time server receives time information from a stratum 1 time source, such as the Global Positioning Service (GPS), the Geostationary Operational Environment Satellite (GOES) or the LORAN-C Radio Navigation System. NTP clients synchronize their clocks by sending requests with various protocol specified timestamps to the time server. The time server processes and returns to the requesting client a reply that includes various other protocol specified timestamps. The client uses the reply from the time server to synchronize its clock.

In performing experiments and tests on a network, it is necessary to test the accuracy of the various local clocks. Currently, NTP client accuracy is tested with a high powered reduced instruction set workstation that is itself an NTP client. The kernel of the operating system of the workstation is modified to give higher priority to time task and less priority to other background system tasks. As those skilled in the art will recognize, a high powered reduced instruction set workstation with a modified kernel is a relatively expensive piece of equipment.

It is therefore an object of the present invention to provide a system and method for testing the accuracy of time clients, including NTP clients, efficiently and relatively inexpensively.

SUMMARY OR THE INVENTION

Briefly stated, the system and method of the present invention test the accuracy of the clock of a client in a network that includes a time server that receives time information from a time source, which is preferably a stratum 1 source. The method polls the time source and the client for timestamps, each at the same regular time interval and both from a single test PC. The polling of the client is offset from the polling of the time source by a fixed time offset and is initiated after the time source polling has begun. Preferably, the regular time interval is much greater than one second and the fixed time offset is substantially equal to half the regular time interval. The method analyzes timestamps received from the time source and the client in response to individual polling.

The timestamps are analyzed first by storing the timestamps as they are received. The stored timestamps are processed by associating each time source timestamp with the first client timestamp received after polling the time source. Occasionally, a time source is busy when it receives a poll. If the time source cannot respond with certainty within a relatively short period, it will not respond at all. Accordingly, there may be missing data points associated with the time source. Any client timestamp associated with a missing time source timestamp is discarded. The method then subtracts each reference time source timestamp from its associated client timestamp to obtain a time interval error (TIE) for each client timestamp. Then the time interval errors may be plotted to produce a graphical indication of time interval error or processed further to produce other indications of client clock accuracy.

The system of the present invention includes a single test personal computer in direct communication with the time source and in communication with the client through the network. The direct communication between the test personal computer and the time source is established through a cable connected between the time source and a serial port of the test personal computer. The test personal computer runs scripts that poll the time source and the client over a preselected testing period. The test personal computer stores the timestamps received from the time source and the client in separate file logs. Preferably, the analysis is performed by importing the stored timestamps into a spreadsheet.

DESCRIPTION OF THE PREFERRED EMBODIMENT

Figure 1:
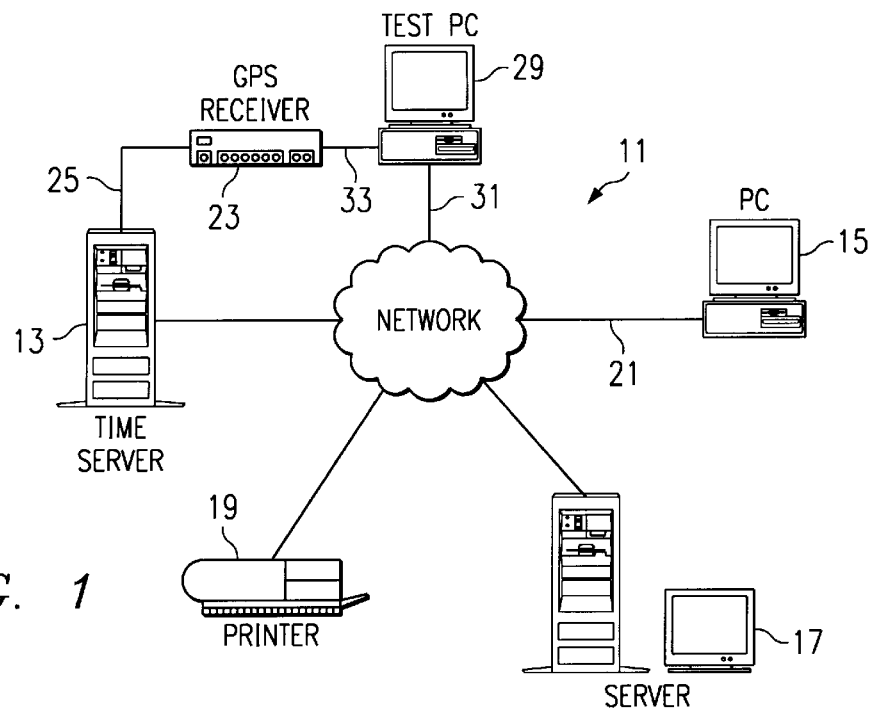
FIG. 1 is a diagram of a preferred embodiment of the system of the present invention.

Referring now to the drawings, and first to FIG. 1, a network is designated generally by the numeral 11. Network 11 may be as large and complex as an ethernet side area network (WAN) or a global telecommunications system, or as small as a Local Area Network (LAN) in a single office or laboratory. In the system of FIG. 1, network 11 is a 10BASE-T (twisted-pair ethernet) network. Network 11 includes a time server 13, a personal computer 15, a server 17, and a printer 19. Since network 11 is a 10BASE-T network, it is based upon a star topology in which each of the nodes, including for example personal computer 15, is connected to an ethernet hub (not shown) by means of a twisted-pair connection 21. The interface between each node and twisted-pair connection 21 is an ethernet Network Interface Controller (NIC) (not shown).

Time server 13 is preferably connected to a GPS receiver 23 by means of an Inter-Range Instrumentation Group (IRIG-6) connection 25. GPS receiver 23 includes an IRIG-6 time code module (not shown) by which time information is passed to time server 13 over connection 25. GPS receiver 23 receives signals from the Global Positioning System by means of a GPS antenna (not shown). Time server 13 provides time synchronization information to clients of network 11, including a personal computer (PC) 15, a server 17, and other network elements (not shown), using network time protocol (NTP). NTP clients must resolve a timestamp with sub-second resolution, and preferably less than a millisecond.

Time server 13 synchronizes its clock according time information received from GPS receiver 23. NTP clients, including personal computer 15, synchronize their clocks with that of time server 13 by sending periodic NTP requests to time server 13. Time server 13 processes the request and sends back to the requesting client a reply, which the requesting client uses to synchronize its clock.

According to the present invention, a test single personal computer (PC) 29 is connected to network 11 by means of an ethernet NIC and a twisted-pair connection 31. While test PC 29 connected to network 11, it is not an NTP client. Test personal computer 29 is also connected directly to GPS receiver 23 by means of an RS-232 interface 33 connected to a serial port (not shown) of test PC 29.

As will be explained in detail hereinafter, test PC 29 is adapted to test the accuracy of a particular NTP client in network 11. For example, test PC 29 can test the accuracy of NTP client PC 15 by running scripts that poll GPS receiver 23 and client PC 15 at fixed regular intervals. Preferably, the interval is chosen to be large so that the effects from RS-232 interrupts and ethernet traffic are minimized. The effects from clock drift of test PC 29 are negligible since both the source (GPS receiver 23) and the client (PC 15) are sampled using the same internal system clock in test PC 29.

In the preferred embodiment, test PC 29 saves the timestamps received from GPS receiver 23 and client PC 15 for analysis by script processing. As will be explained in detail hereinafter, the analysis includes performing various standard calculations to measure time interval error (TIE), maximum time interval error (MTIE), and Allen variance. The results of the analysis may be displayed in graphic form, as by printing plots of the data on printer 19.

Figure 2A:
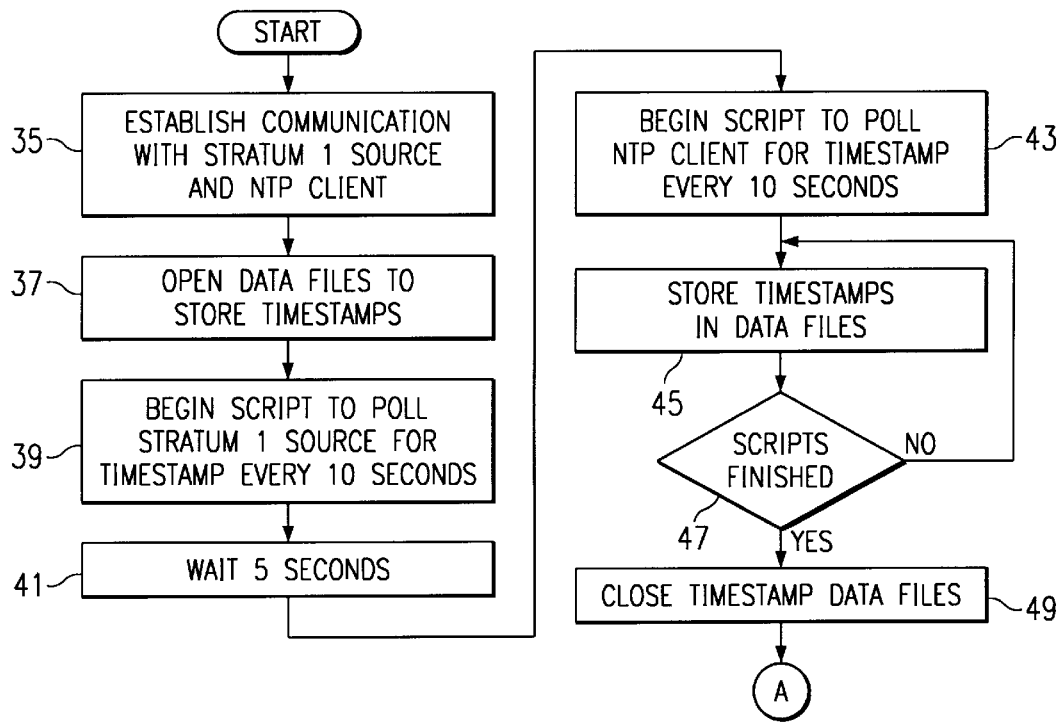
FIGS. 2A, 2B and 2C and comprise a flowchart of a preferred software implementation of the method of the present invention.

Referring now to FIG. 2A, there is shown a high level flow chart of the logic of a preferred software implementation of the method of the present invention. The method starts at block 35, wherein communication is established with the stratum 1 source, which in the embodiment illustrated in FIG. 1 is GPS receiver 23, and the NTP client (e.g. PC 15). After communication has been established, the system opens data files to store timestamps, at block 37. Then, the system starts a script to poll the stratum 1 source for a timestamp every ten seconds, at block 39. The polling or sampling interval is chosen to be sufficiently large as to minimize the effects from RS-232 interrupts and ethernet traffic. The script sends a time of day (TOD) request to the stratum 1 source every ten seconds over a preselected period, which in the preferred embodiment may be 24 hours.

After starting the script to poll the stratum 1 source, the system waits five seconds, at block 41, and begins a script to poll the NTP client for a timestamp every ten seconds, at block 43. Thus, the system of the present invention uses separate, independently running, scripts to poll the stratum 1 source and the NTP client. However, the polling interval in each script is the same. Since the script to poll the NTP client is started five seconds after the start of the script for the stratum 1 source, the system polls either the stratum 1 source or the NTP client once every five seconds. The polling interval may be selected to be different from ten seconds, but the polling intervals for both the stratum 1 source and the NTP client should be the same. Additionally, the wait after starting the script to poll the stratum 1 source should be substantially half the polling interval.

After the scripts have been started at blocks 39 and 43, the system stores the timestamps as they are received in data files, at block 45. The system continues to store timestamps until the scripts are finished at decision block 47. After the scripts are finished, the system closes the timestamp data files, at block 49.

Figure 2B:
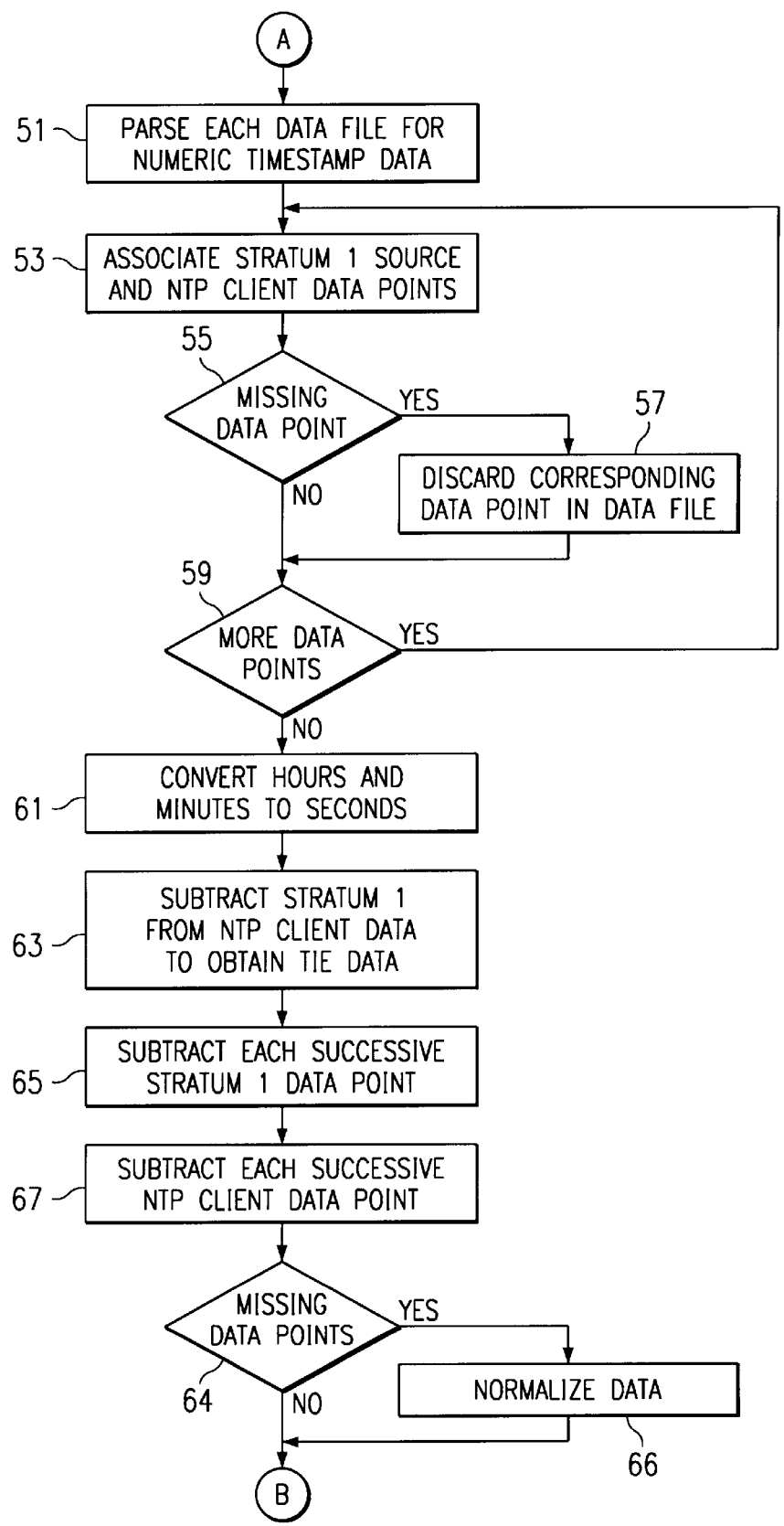

Referring now to FIG. 2B, the system parses each data file for numeric timestamp data, at block 51. Then, the system associates each stratum 1 source data point with a corresponding NTP client data point, at block 53. In the preferred embodiment, the stratum 1 source data points and the NTP client data points are associated according to the order in which they were polled. Thus, the timestamp received in response to the first poll of the NTP client is associated with the timestamp received in response to the first poll of the stratum 1 source, the second with the second, and so on. Then, the system tests at decision block 55 whether or not any data point is missing. Occasionally, the stratum 1 source will be busy when it receives the poll. If the stratum 1 source cannot respond within a certain, relatively short, time, it will not respond at all. Accordingly, there may be missing data points associated with the stratum 1 source. Whenever, at decision block 55, a data point is missing, the system discards the corresponding data point in the data file, at block 57. The system continues to associate stratum 1 source and NTP client data points and tests for missing data points until, at decision block 59, there are no more data points.

After all of the data points have been associated, the system converts hours and minutes to seconds at block 61. Then, the system subtracts the stratum 1 data from the NTP client data to obtain time interval error (TIE) data, at block 63. Additionally, the system subtracts each successive stratum 1 data point at block 65. Similarly, the system subtracts each successive NTP client data point at block 67.

The system tests, at decision block 64, whether there are any missing data points between successive data points subtracted at blocks 65 and 67. If so, the system, at block 66, normalizes the data by subtracting the product of the number missing data points multiplied by the polling interval from the result of the subtraction performed at block 65. Thus, if there is one missing data point, the system subtracts one polling interval.

In the preferred embodiment, the associations and calculations in FIG. 2B are performed in a suitably programmed spread sheet.

Figure 2C:
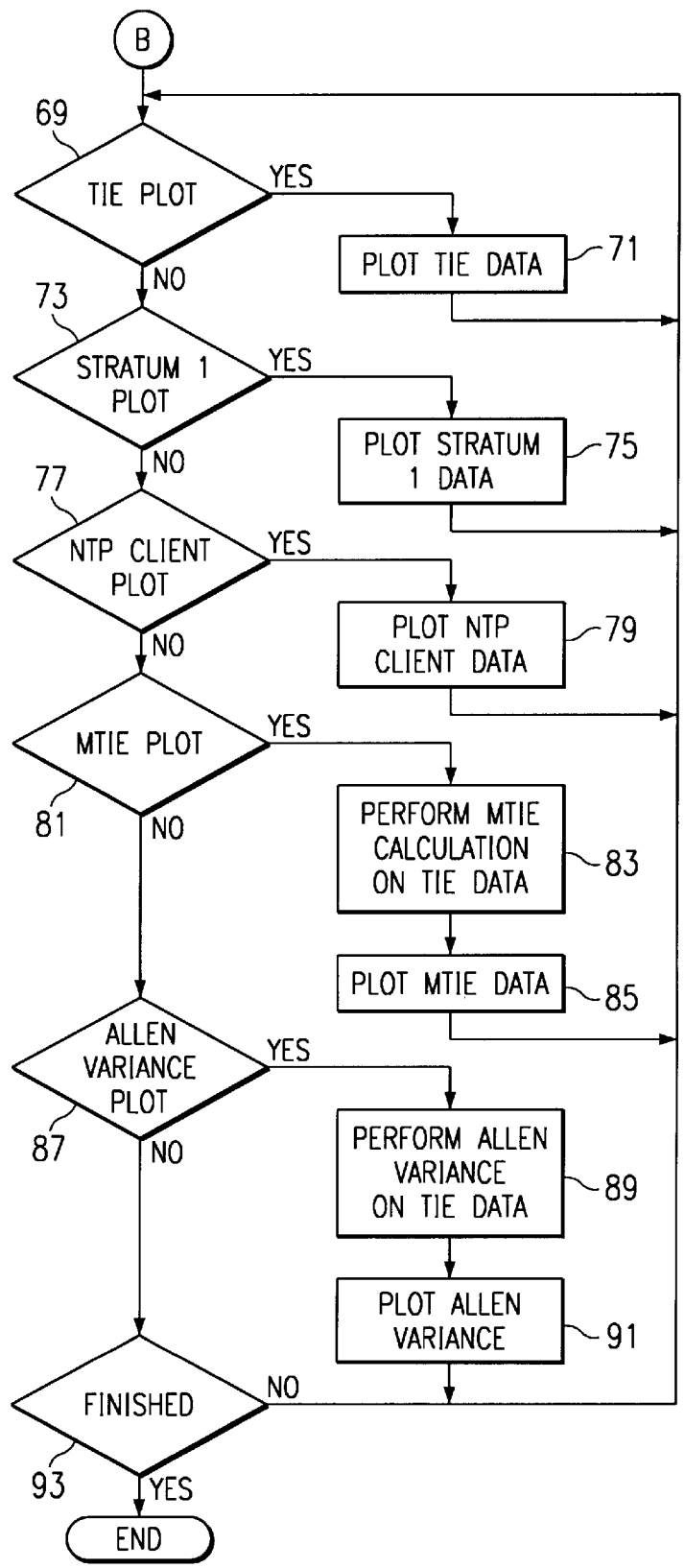

Referring now to FIG. 2C, an analyst can cause the system to plot various graphical representations of the data collected and analyzed in FIGS. 2A and 2B. First, at decision block 69, an analyst can cause the system to plot TIE data, at block 71. A plot of TIE data is a representation of the difference between each NTP client timestamp and its corresponding stratum 1 timestamp versus its sample number. Since, in the preferred embodiment, the polling of the stratum 1 source and the NTP client are all set by five seconds, the plot of TIE data should be clustered around five seconds.

Analysts can also cause the system to plot stratum 1 source data at decision block 73 and block 75. The plot of stratum 1 data is simply a plot of the intervals between each successive timestamp from the stratum 1 source plotted against time. Since the stratum 1 source is sampled once every ten seconds, the data should be clustered around ten seconds. Variance from ten seconds is a good indication of delays in RS-232 interface 33 of FIG. 1, wander of the internal clock of test PC 29, and variance of the stratum 1 source, in decreasing order.

Similarly, the analyst can choose to plot NTP client data at decision block 77 and block 79. Again, in the preferred embodiment, the plot of NTP client data should be clustered around ten seconds. Variance from ten seconds is a good indication of wander of the internal clock of client PC 15, delays due to ethernet traffic, and wander of the internal clock of test PC 27, in decreasing order. A comparison of the stratum 1 data plot with the NTP data plot can yield useful information about errors that are attributable to the clock of the NTP client.

The analyst can also cause the system to plot maximum time interval error (MTIE), at decision block 81. The maximum time interval error plot shows the maximum time interval error over several particular periods of time during the sampling period. Thus, the system performs an MTIE calculation on the data at block 83 and plots the MTIE data at block 85.

Finally, the analyst can select to plot allen variance at decision block 87. Allen variance is a statistical measurement used for characterizing the frequency stability of clocks. Allen variance shows stability in the time domain and is used when characterizing intermediate to long term stability of clocks and oscillators. Allen variance is a plot of frequency instability versus observation time. Thus, the system performs an Allen variance calculation on the data, at block 89, and plots the Allen variance data at block 91.

Any of the foregoing plots can be selected until the analyst is finished at block 93.

From the foregoing, it may be seen that the present invention is well adapted to overcome the shortcomings of the prior art. The present invention is implemented with a suitably programmed personal computer, rather than a powerful reduced instruction set workstation with a modified kernel. Although test PC 29 is connected to network 11, it is not an NTP client. Thus, the test PC samples the source and client independent of local NTP clock synchronization adjustments. Care should be taken when the preferred software implementation is running such that background applications and tasks such as screen savers, e-mail, scheduled maintenance, and the like are turned off in order to minimize interruption of the sampling process.

What is claimed is:

1. A system for testing the accuracy of a time client in a network that includes a time server, said time server receiving time information from a time source, said system comprising:

a single test personal computer in direct communication with said time source and in communication with said time client through said network, said test personal computer including:

means for polling said time source for timestamps at a regular time interval;

means for polling said time client for timestamps at said regular time interval, the polling of said network time protocol client being offset from the polling of the time source by a fixed time offset; and, means for analyzing timestamps received from said time source and said time client in response to said polling.

2. The system as claimed in claim 1, wherein direct communication between said test personal computer and said time source is established through a cable connected between said time source and a serial port of said test personal computer.

3. The system as claimed in claim 1, including means for plotting data based on timestamps received from said time source and said time client.

4. The system as claimed in claim 1, wherein said means for plotting data based on timestamps received from said time source and said time client includes a printer in communication with said test personal computer.

5. A method of testing the accuracy of a time client in a network that includes a time server, said time server receiving time information from a time source, said method comprising the computer implemented steps of:

polling said time source for timestamps at a regular time interval;

polling said time client for timestamps at said regular time interval, the polling of said time client being offset from the polling of the time source by a fixed time offset; and, analyzing timestamps received from said time source and said time client in response to said polling steps.

6. The method as claimed in claim 5, including the step of storing said timestamps received in response to said polling steps.

7. The method as claimed in claim 6, wherein said step of analyzing said timestamps includes the step of processing said stored timestamps.

8. The method as claimed in claim 7, wherein said step of processing said store timestamps include the steps of associating each time source timestamps with one time client timestamp.

9. The method as claimed in claim 8, wherein said step of processing said stored timestamps includes the step of subtracting each time source timestamp from its associated time client timestamp to obtain a time interval error for each time client timestamp.

10. The method as claimed in claim 6, wherein said step of processing said stored timestamps includes the step of plotting the time interval errors for the time client timestamps.

11. The method as claimed in claim 6, wherein said step of processing said stored timestamps includes the step of forming a plot of maximum time interval errors for the time client timestamps.

12. The method as claimed in claim 6, wherein said step of processing said stored timestamps includes the step of forming a plot of Allen variance for the time client timestamps.

13. The method as claim 8, wherein said step of processing said stored timestamps includes the step of discarding any time client timestamp associated with a missing time source timestamp.

14. The method as claimed in claim 5, wherein said regular time interval is greater than about five seconds.

15. The method as claimed in claim 14, wherein said regular time interval substantially equal to ten seconds.

16. The method as claimed in claim 5, including the step of establishing communication with said time source directly.

17. The method as claimed in claim 5, including the step of establishing communication with said network time client via said network.

18. The method as claimed in claim 5, wherein said fixed time offset is substantially equal to half said regular time interval.

19. The method as claimed in claim 5, wherein said time source timestamps and said time client timestamps have a resolution less than or equal to one millisecond.

20. The method as claimed in claim 5, wherein said time client is a Network Time Protocol client.

21. The method as claimed in claim 5, wherein said time source is a stratum 1 time source.

\* \* \* \* \*